United States Patent [19]

Davis et al.

[11] 4,019,103

[45] Apr. 19, 1977

[54] ELECTROMAGNETIC MOTOR AND GENERATOR

[76] Inventors: Oliver Thurston Davis; Norman Ray Jones, both of Rte. 1, P.O. Box 33, Dunlap, Tenn. 37327; Elmer Carl Eddy, Rte. 1, P.O. Box 258, Whitwell, Tenn. 37397

[22] Filed: Mar. 5, 1976

[21] Appl. No.: 664,089

[52] U.S. Cl. .................. 318/37; 310/113; 310/24; 310/34; 310/35
[51] Int. Cl.² .................................... H02K 33/12
[58] Field of Search .............. 310/23, 24, 32, 34, 310/35, 30, 113, 46; 318/37, 38

[56] References Cited
UNITED STATES PATENTS

| | | | |
|---|---|---|---|
| 1,912,491 | 6/1933 | Foust | 310/354 |
| 2,279,690 | 4/1942 | Lindsey | 310/46 |
| 2,338,005 | 12/1943 | Morch | 310/24 |
| 2,486,940 | 11/1949 | Hinchman | 310/34 |
| 2,570,766 | 10/1951 | Chenault | 310/35 |
| 3,328,656 | 6/1967 | Dotson | 318/37 |
| 3,436,573 | 4/1969 | Persson | 310/13 |
| 3,832,608 | 8/1974 | Mills | 318/37 |

Primary Examiner—Donovan F. Duggan

[57] ABSTRACT

An electromagnetic motor and generator is disclosed having a pair of solenoids wound on a cylinder, each of said solenoids comprising three separate but connected windings. A magnetizable piston is positioned for reciprocation in the cylinder and is connected to a rotatably mounted crankshaft. A commutator connected to the crankshaft and interposed in an electric circuit selectively energizes the solenoids to cause rotary motion of the crankshaft. An additional circuit means is also provided for recapturing electrical energy generated in each of the solenoids upon deenergization of the solenoid by said switch.

11 Claims, 5 Drawing Figures

ELECTROMAGNETIC MOTOR AND GENERATOR

BACKGROUND OF THE INVENTION

1. Field of the Invention

This invention relates to electromagnetic motors of the reciprocating piston type and more particularly to an electromagnetic motor having circuit and coil means associated therewith for recapturing a substantial portion of the electrical energy supplied to operate the motor.

2. Discussion of the Prior Art and Objects

Applicants are unaware of any electromagnetic motor having separate circuit and coil means associated therewith for recapturing a substantial portion of the electrical energy supplied to the motor to operate it. Heretofore, the large electromotive force (emf) or induced voltage generated upon deenergization of the windings comprising the motor was wasted either because no suitable circuitry was connected thereto for utilizing the voltage or the winding was shorted resulting in the energy being dissipated in the windings as heat.

Applicants, realizing the substantial current generated as a magnetic field around a coil collapses, have maximized this current by a unique coil design and provided circuitry to utilize the current either to perform useful work such as lighting lights or to recapture it by charging a storage battery. Further, by providing windings over the aforementioned coil, additional useful current can be generated both during energization and deenergization of the coil.

It is therefore the primary object of the present invention to provide an electromagnetic motor of the reciprocating type which has a mechanical as well as an electrical output.

It is another object of the present invention to provide an electromagnetic motor-generator whose electrical output is approximately one-third of the electrical energy being supplied thereto.

It is a further object of the present invention to provide an electromagnetic motor-generator having a unique coil design for maximizing both the mechanical as well as the electrical output of same.

It is yet another object of the present invention to provide an electromagnetic motor-generator which is relatively simple in its construction and highly economical in its cost of operation.

These together with other objects and advantages which will become subsequently apparent reside in the details of construction and operation as more fully hereinafter described and claimed, reference being made to the accompanying drawings forming a part hereof, wherein like characters of reference refer to like parts throughout, and in which:

DETAILED DESCRIPTION OF THE PREFERRED EMBODIMENT

Figure 1:
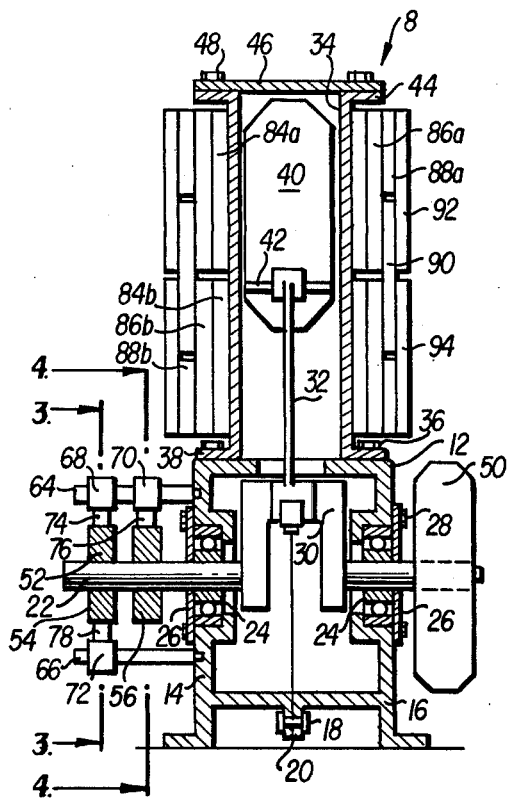
FIG. 1 is a side elevational view partly in vertical section of the motor-generator of the present invention.
Figure 2:
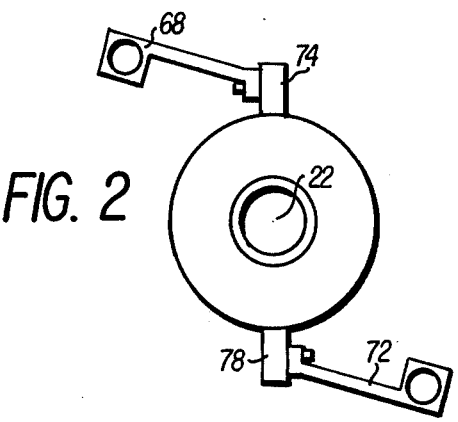
FIG. 2 is an end view of the motor-generator looking from left to right showing the commutator.
Figure 3:
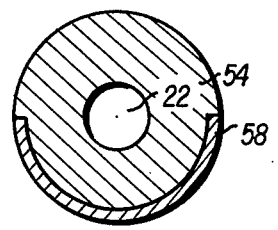
FIG. 3 is a view in cross section of a portion of the commutator taken along the lines 3—3 of FIG. 1.
Figure 4:
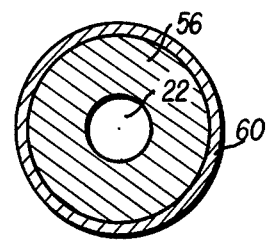
FIG. 4 is a view in cross section of a portion of the commutator taken along the lines 4—4 of FIG. 1.

Referring more specifically to the drawings, applicant's novel motor-generator is designated generally 8 and associated electrical circuitry 10. The motor-generator 8 includes a housing 12 formed of two sections 14, 16 which are held together by bolt 18 through flanges 20. A crankshaft 22 is rotatably mounted in bearings 24 positioned in recesses formed in sections 14, 16. The bearings 24 are held in position by plates 26 and bolts 28. The crankshaft 22 has a crank 30 to which is secured one end of a piston rod 32.

A cylinder 34 is secured to the housing 12 by means of bolts 36 extending through circular flange 38 on the lower end of the cylinder. The cylinder 34 is formed of a non-magnetic material. A piston 40 made of iron or other highly magnetizable material is slidable within the cylinder 34 and is secured at its lower end to piston rod 32 by means of a wrist pin 42. The piston 40 has cone-shaped ends exposed to the inside walls of the cylinder 34 and the magnetic field created therein by means to be described later is thought to be greater than that which exists for a piston having a flat upper and lower end. Applicant does not, however, wish to be limited to this theory of operation of piston 40. The upper end of cylinder 34 also has a circular flange 44 to which is secured an end cap 46 by means of bolts 48.

A flywheel 50 is attached to one end of the crankshaft 22 outside of the housing 12 and a commutator 52 is secured to the other end of the crankshaft, also outside of the housing 12. The commutator 52, as can be more clearly seen by referring to FIGS. 1–4, comprises a first portion 54 and a second portion 56, each disc shaped and made of an electrical insulating material. The periphery of portion 54 has a recess which contains a strip of electrical conducting material 58, preferably of copper and extends through an arc of approximately 180°. Second portion 56 is of a slightly less diameter than first portion 54 and has a continuous or 360° ring 60 of electrical conducting material, also preferably of copper, secured thereto. Strip 58 and ring 60 are electrically connected together as by, for example, a heavy gauge copper wire 62.

An upper rod 64 and lower rod 66 are secured at one end by threads to section 14 and extend parallel to crankshaft 22. The upper rod 64 has a pair of brush arms 68, 70 rotatably mounted thereon and biased in the direction of commutator 52 by means, not shown, as in brush arm 72 rotatably mounted on lower rod 66. Brush arms 68, 70, 72 have brush elements 74, 76, 78, respectively secured thereto but electrically insulated therefrom. Brush elements 74 and 78 are disposed opposite to and in communication with first portion 54 of commutator 52 whereas brush element 76 is disposed opposite to and in communication with second portion 56. The brush elements are in communication with the respective commutator portions during the entire rotation of the commutator 50.

Wound on cylinder 34 are upper and lower solenoids 80, 82 respectively. Upper solenoid 80 consists of a first continuous close winding of insulated copper wire 84a adjacent the cylinder 34 and extending around the cylinder in four layers between the upper end of the cylinder and the approximate middle of the cylinder. A similar winding 84b is wound between the approximate middle of the cylinder 34 and the lower end of the cylinder. A second, close, continuous winding of insulated wire 86a is wound on top of winding 84a also in four layers and co-extensive with winding 84a. Again a similar winding 86b is wound co-extensive with winding 84b. A third winding 88a consisting of a set of four separate insulated wires adjacent to each other are wound in four layers on winding 86a and extend from the upper end of cylinder 34 to the approximate midpoint of winding 86a. Again, a similar winding 88b is wound on winding 86b from the bottom of cylinder 34 to the approximate midpoint of winding 86b.

Figure 5:
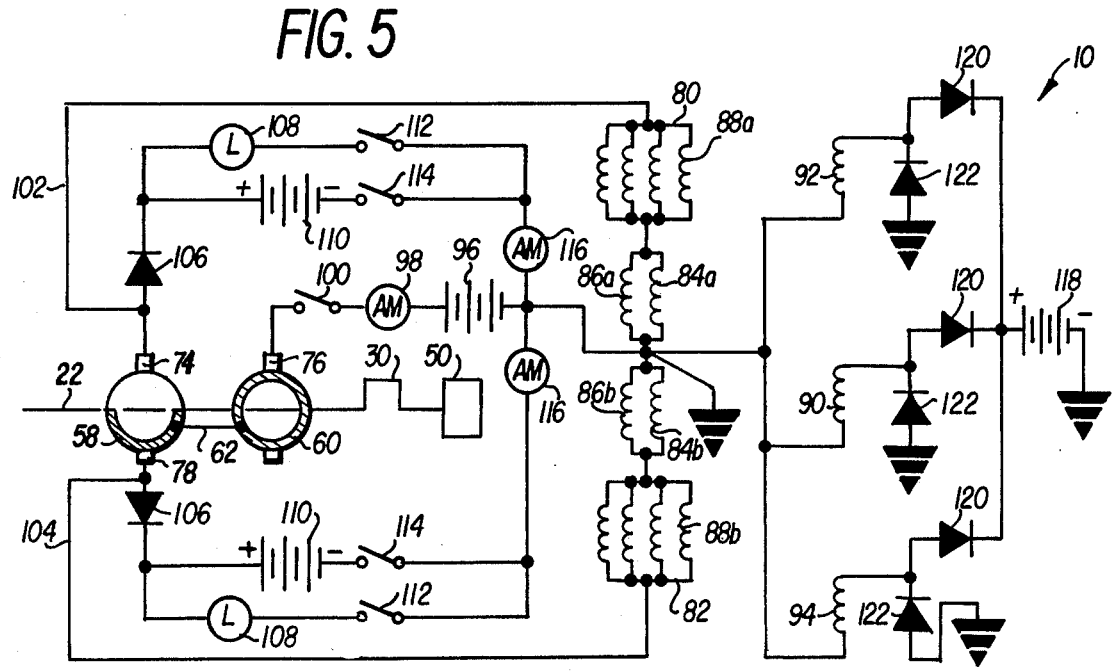
FIG. 5 is a diagrammatic electrical circuit of the motor-generator.

As can be seen by referring to FIG. 5, upper windings 84a and 86a are electrically connected in parallel with each other and grounded at one end by connection to housing 12. The other end of windings 84a and 86a are electrically connected in series with each winding 88a. Each wire of winding 88a is itself electrically connected in parallel with the other. The lower windings 84b and 86b are similarly electrically connected in parallel with each other and with one end grounded to housing 12. The other end of windings 84b and 86b are electrically connected in series with windings 88b which are, in turn, electrically connected in parallel with each other. The effect of the aforementioned series parallel connections of windings 84a, b, 86a, b and 88a, b will be more fully described later.

In addition to the solenoids 80, 82, three additional windings 90, 92, 94 of four layers each are provided which are electrically unconnected to the solenoids 80, 82 and which recapture a portion of the electrical energy expended in solenoids 80, 82 to drive the motor in a manner to also be described later. Winding 90 is wound on windings 86a and 86b between windings 88a and 88b. Winding 92 is wound on winding 88a from the upper end thereof to the approximate midpoint of winding 90. Similarly, winding 94 is wound on winding 88b from the lower end thereof to the approximate midpoint of winding 90.

With regard to the motor aspect of the present invention, in order to effect rotary motion of shaft 22 and flywheel 50, piston 40 must be made to reciprocate in cylinder 34. This reciprocating motion of piston 40 is achieved in a well known manner by alternately energizing solenoids 80, 82. The alternate energization of solenoids 80, 82 is accomplished with commutator 52 and battery 96. The negative side of battery 96 is connected to ground, i.e. housing 12 and the positive side of battery 96 is serially connected with an ammeter 98, a switch 100 and commutator brush 76. Commutator brush 76 is in continual engagement with ring 60 during rotation of commutator 52 to thereby transmit electrical energy from brush 76 to strip 58 via conductor 62. Brush 74 is disposed opposite strip 58 and contacts the strip 58 only during a portion of each revolution and brush 78 is disposed opposite strip 58 and brush 74 and contacts the strip 58 during another portion only of each revolution of commutator 52. Brush 74 is then connected by conductor 102 to the upper or ungrounded end of first solenoid 80 and brush 78 is connected by conductor 104 to the lower or ungrounded end of second solenoid 82. Energization of upper and lower solenoids 80, 82 by closure of switch 100 when strip 58 is in contact with brushes 74, 78 respectively, causes a magnetic field to be generated in the solenoids which in turn draws the piston 40 up and down and imparts rotational motion to shaft 22.

In order to maximize the magnetic flux field and thus the mechanical output of the motor during energization of the solenoids as well as to convert as much of the magnetic field back into useful electrical energy during deenergization of the solenoids, applicants have connected the four wires comprising third winding 88a and 88b in parallel with each other. The parallel connection of the windings or coil increases the Q or quality factor of the winding assembly and is defined as the ratio of coil reactance to coil resistance. As can be seen in such a parallel connection of the four wires, the number of ampere-turns for a given coil space is maximized as compared to the increase in the resistance of the coil. The resultant coil is therefore of a relatively low impedance, low resistance and of a high current character which matches the low voltage, high current source battery 96. The rapid and large flux buildup in windings 88a and 88b causes a great initial pulling force on piston 40 when the windings are energized.

The continuous windings 84a and 84b as well as 86a and 86b also exert a pulling force on piston 40 as their respective magnetic flux fields develop. However, as the fields of windings 84a and 84b as well as 86a and 86b develop much more slowly than the fields in coils 88a and 88b, their presence is of secondary importance as regards the drive or motor aspect of the invention but become of primary importance with regard to the generator aspect of the invention. Windings 84a and 84b, consisting of less turns of larger diameter wire than that of windings 86a and 86b, will have their magnetic flux fields develop slightly faster than that of windings 86a and 86b and for this reason they are wound adjacent cylinder 34 and are able to aid windings 88a and 88b in drawing piston 40. However, again to minimize the impedance as well as resistance of the combined windings 84a, 86a and 84a and 86b, they are also connected in parallel with each other and in series with the parallel connected windings of winding 88a and 88b respectively. By providing the windings and their electrical interconnection as just described, applicants have achieved an extremely efficient and powerful reciprocating solenoid actuated plunger type of motor.

As previously mentioned, in motors of this type in the prior art, when the commutator deenergized one solenoid and energized the opposite solenoid to cause reciprocating motion of the piston, the deenergized circuit was normally left open. Applicants, recognizing the substantial magnetic energy stored in the magnetic field of the solenoid the instant the circuit thereto was opened by the commutator, developed a circuit to capture this energy and put it to use.

It is well known that when power is supplied to a simple circuit that contains resistance, some of the power appears in the form of heat. The remainder of the power becomes the kinetic energy of the current and is stored as magnetic energy in the magnetic field. When the power is removed from the circuit, interrupting the current flow, the magnetic field collapses and returns its energy to the circuit by cutting the circuit and inducing an electromotive force (emf) in it. The magnitude of the emf induced in a coil (continuous conductor) is directly proportional to the number of turns of the conductor comprising the coil, the strength of the magnetic field and the speed of the relative motion between the conductor and the magnetic field. There is thus an induced emf or voltage across the solenoids 80, 82 the instant they are deenergized by the commutator 52 which is caused by the collapsing magnetic field as aforementioned as well as the rapid movement of the magnetized piston relative to the solenoids.

The voltages induced in the windings of each solenoid 80, 82 are cumulative and are generated at different rates depending on the inductance of each winding. Windings 88a and 88b are of low inductance in comparison to windings 84a and 84b as well as 86a and 86b. Thus, the rate at which the induced voltage or current decays or falls to zero in windings 88a and 88b will be the greatest with the rate of decay of windings 84a and 84b being considerably slower and that of winding 86a and 86b being the slowest.

This is important in that windings 88a and 88b are primarily responsible for providing the attraction or driving force to piston 40 and windings 84a, 84b, 86a and 86b being progressively less important in this respect. However, windings 84a, 84b, 86a and 86b are wound substantially the length of travel of piston 40 and are of primary importance in generating the voltage or current as the flux field therearound collapses and windings 88a and 88b are of secondary importance in this respect. The voltage induced in windings 84a and 84b is further increased due to the motion of magnetized piston 40 relative thereto.

By constructing each solenoid of three different windings, positioning the windings relative to each other and to the cylinder and electrically connecting them as herein disclosed, applicants have achieved a highly efficient motor-generator and one capable of returning or recapturing a full one-third of the current used to drive the motor.

In order to utilize this induced voltage, applicants have provided a circuit through which current can flow. This circuit comprises a diode 106 in series with the commutator brush 74 and a load which in turn is connected to ground. The load may, for example, comprise a light(s) 108 and battery 110 each in series with a switch 112, 114 respectively and the combination connected in parallel. The diode 106 is connected in the circuit as shown so as to insure that the current flowing to the positive side of the battery is always positive. A similar circuit is also connected between brush 78 and ground. In order to measure the number of amperes flowing in the load circuit, ammeters 116 are provided.

In order to capture additional useful current during operation of the motor-generator hereinsofar described, applicants have provided the additional windings 90, 92 and 94 around solenoids 80, 82. As the solenoid 80 is energized, the magnetic field created thereabout links coil 92 and part of coil 90. When solenoid 80 is deenergized and solenoid 82 energized by commutator 52, the magnetic flux linking coils 92 and 90 will decrease or change with time thereby inducing an emf or voltage therein. A similar emf or voltage will be induced in the remaining portion of coil 90 as well as in coil 94 when solenoid 82 is deenergized. In order to obtain usable current from the induced voltages in coils 90, 92, 94, a circuit is provided wherein one end of each coil 90, 92, 94 is connected to ground (housing 12), the other end of each coil being connected in series with a load which in turn is connected to ground (housing 12). If the load is a storage battery 118, it is necessary that only the positive component of the generated current reach the positive terminal of the storage battery and to insure this, diodes 120 are connected in series with the ungrounded ends of coils 90, 92, 94 and the positive terminal of battery 110. Also connected to the ungrounded ends of coils 90, 92, 94 are diodes 122 which are themselves, in turn, grounded (housing 12) thus permitting the unwanted negative component of any current generated to be passed to ground. The heretofore described diode connections between coils 90, 92, 94 and battery 110 are in configuration commonly called a "diode bridge".

OPERATION

As viewed in FIG. 5, when the motor-generator 8 is connected to storage battery 96 by closure of switch 100, solenoid 82 will be energized as a result of the position of commutator strip 58 and brush 78. Energization of solenoid 82 will draw piston 40 downward. It is primarily the magnetic field generated by the four parallel connected wires of winding 88b and secondarily the magnetic field generated by windings 84a and 86b that draws the piston 40 down. When piston 40 reaches the lowermost point of its travel, brush 74 will contact strip 58 energizing solenoid 80 and deenergizing solenoid 82. When solenoid 80 is energized, it is primarily the magnetic field generated by the four parallel connected wires of winding 88a and secondarily the magnetic field generated by windings 84a and 86a that draws the piston 40 up. As crankshaft 22 rotates, the momentum of flywheel 50 will insure that strip 58 of commutator 52 is in the required position for contact with brushes 74 and 78 and the current drawn by the motor will be indicated on ammeter 98.

As piston 40 is being drawn into solenoid 82, an emf or voltage is induced in solenoid 80 both as a result of the collapsing magnetic field as solenoid 80 is deenergized and by the motion of piston 40 leaving solenoid 80. The induced voltage is greatest in windings 84a and 86a because of their size and proximity to piston 40 and less in the four parallel connected wires of winding 88a. The same is true as piston 40 is drawn into solenoid 80 by energization thereof, an emf or voltage is induced in solenoid 82 as it is deenergized. The induced voltage is greatest in windings 84b and 86b and less in winding 88a for the reasons aforementioned with respect to solenoid 80. To summarize, windings 88a and 88b are of primary importance in providing the driving force of piston 40 and windings 84a, 84b, 86a, 86b are of secondary importance in this respect, whereas, windings 84a, 84b, 86a, 86b are of primary importance in generating the emf or voltage for the load circuits and windings 88a and 88b are of less importance in this respect.

Until switches 112, 114 are closed, the emf or voltage induced in solenoids 80 and 82 when they are deenergized, as previously discussed, is lost as there is not circuit in which current can flow. Upon closure of switches 112 or 114 or both, a circuit is completed and current can flow therein resulting from the induced voltage in solenoids 80, 82. This current is indicated on ammeters 116. After closure of switches 112, 114, there is no noticeable decrease in the speed of the motor nor does ammeter 98 indicate that any more current is being drawn from battery 96 than when switches 112, 114 are open which, therefore, indicates that all of the current flowing in the load circuits and indicated on ammeters 116 is being generated by the collapsing magnetic fields upon deenergization of solenoids 80, 82 and the movement of magnetized piston 40. The reason no current is being drawn by the load circuits from battery 96 whenever the commutator strip 58 is in contact with either brush 74 or 78 is because the load circuits offer a relatively high resistance to the flow of current when compared to the resistance offered by the solenoids 80, 82, thus the current from battery 96 follows the path of least resistance, i.e. to solenoids 80, 82 and not to the load circuits.

Applicants have observed that, due to their unique solenoid winding arrangement and associated circuitry as herein described, a full one-third of the amount of current being drawn from battery 96 to run the motor is being recaptured for use in the load circuits with no noticeable decrease in the speed of the motor or increase in the current being drawn by the motor. Additional usable current on the order of approximately one-sixth of the amount being drawn by the motor from battery 96 is recaptured by coils 90, 92 and 94 to be used, for example, to recharge storage battery 110.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A motor-generator comprising:
   a. a cylinder having a pair of solenoid means disposed one around each end thereof and a magnetizable piston reciprocally mounted in said cylinder, said piston being swingably connected by link means to a rotatably mounted crankshaft means;
   b. switch means operatively connected to said crankshaft means and interposed in an electric circuit for selectively energizing said solenoids to cause rotary motion of said crankshaft means; and
   c. additional circuit means connected to each of said solenoids for recapturing electrical energy generated in each of said solenoids, upon deenergization of said solenoids by said switch means.

2. A motor-generator as set forth in claim 1 wherein said additional circuit means comprises diode means serially connected with a load means and said serially connected diode and load means being connected in parallel across said solenoid means.

3. A motor-generator as set forth in claim 1 wherein each of said solenoid means comprises first, second and third winding means.

4. A motor-generator as set forth in claim 3 wherein said first winding means of each of said solenoid means extends from an end of said cylinder to the approximate midpoint thereof, said second winding means of each of said solenoid means is substantially co-extensive with and over said first winding means and said third winding means extends over said second winding means from an end of said cylinder to the approximate midpoint of said second winding means.

5. A motor-generator as set forth in claim 4 wherein said first and second winding means are connected in parallel with each other and in series with said third winding means.

6. A motor-generator as set forth in claim 5 wherein said third winding means comprises four separate windings all connected in parallel with each other.

7. A motor-generator as set forth in claim 1 further comprising additional coil means wound on said solenoid means and circuit means connected to said coil means for recapturing electrical energy generated in said coil means by the energization and deenergization of said solenoid means.

8. A motor-generator as set forth in claim 7 wherein said coil means comprises three separate windings, at least a portion of two of said separate windings being wound on said solenoid means and on the third of said separate windings.

9. A motor-generator as set forth in claim 7 wherein said circuit means connected to said coil means includes diode bridge means for rectifying the alternating electrical energy generated in said coil means.

10. A motor-generator as set forth in claim 3 wherein the diameter of wire comprising said first and third windings is the same and greater than the diameter of the wire comprising said second winding.

11. A motor-generator as set forth in claim 1 wherein said piston has the ends thereof in the shape of a cone.

* * * * *